2,985,619
STABILIZERS FOR HALOGEN-CONTAINING HIGH POLYMERS

Ernst Roos and Martin Burgdorf, Leverkusen, and Friedrich Lober, Leverkusen-Bayerwerk, Germany, assignors to Farbenfabriken Bayer Aktiengesellschaft, Leverkusen, Germany, a corporation of Germany No Drawing. Filed Nov. 24, 1958, Ser. No. 775,721
Claims priority, application Germany Nov. 28, 1957
11 Claims. (Cl. 260—45.9)

This invention relates to stabilizers for high polymers, more particularly to halogen-containing high polymers.

Polymers and copolymers of high molecular weight which contain halogen, such as for example polymers of vinyl chloride, copolymers of a predominant quantity of vinyl chloride with vinyl acetate, as well as polymers and copolymers of vinylidene chloride, suffer undesirable changes under the action of heat and light, and these changes lead to discoloration, deterioration of the mechanical properties and the splitting off of vapours with a corrosive action.

Since elevated temperatures are required for the processing of the said polymers and copolymers and, as they are also exposed to daylight when subsequently used, it is necessary to add to them stabilizers which prevent both discoloration and also the lowering of their mechanical properties.

A large number of inorganic, organic, mixed inorganic and organic, and organometallic compounds have already been proposed for this purpose. Generally speaking, however, these stabilizers do not satisfy the condition of simultaneously stabilizing the polymers against both heat and light, for example some of the proposed compounds are certainly good heat stabilizers, but are found to be ineffective or even disadvantageous as regards the influence of light. On the other hand some compounds have good action in protecting against light, but on the other hand do not influence the degradation of the polymers due to heat.

Furthermore, other stabilizers which have been proposed do not conform as regards their physiological properties to the standards which are set, for example, for stabilized polymers for packing of foodstuffs.

It is an object to provide stabilizers for halogen-containing high polymers which have stabilizing properties against both heat and light. A further object is to provide stabilizers which have good physiological properties. Further objects will appear hereinafter.

These objects are attained in accordance with the present invention by using 3-amino-1,2,4-triazole and its substitution products as very effective stabilizers for halogen containing polymers or copolymers of high molecular weight.

Particularly effective are those derivatives of 1,2,4-triazole of the general formula

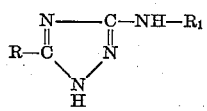

in which R represents a hydrogen atom or an alkyl, aralkyl, cycloalkyl or aryl radical, which may be substituted by halogen atoms and hydroxyl, alkyl, and alkoxy groups, and $R_1$ represents R of the grouping —$CONHR_2$, wherein $R_2$ represents a lower alkyl radical or hydrogen.

Suitable polymers of high molecular weight are more especially those of vinyl chloride as well as copolymers containing a predominant proportion of vinyl chloride besides vinylidene chloride or vinylidene acetate in polymerized form.

Examples of the triazoles used according to the invention are: 3-amino-1,2,4-triazole; 3-amino-5-methyl-1,2,4-triazole; 3-amino-5-heptadecyl-1,2,4-triazole; 3-amino-5-phenyl-1,2,4-triazole; 3-ureido-5-methyl-1,2,4-triazole; 3-ureido-5-heptadecyl-1,2,4-triazole or 3-ureido-5-phenyl-1,2,4-triazole. These compounds can be prepared by methods known per se.

By comparison with the known stabilizers containing heavy metals these purely organic compounds have the advantage that they possess a better compatibility with the vinyl polymers and plasticizers and consequently do not tend to effloresce or sweat. Polymers stabilized with these compounds are physiologically unobjectionable and are inert to the influence of hydrogen sulfide a fact which in polymers containing metals often leads to undesirable discoloration due to formation of the sulfide. Furthermore, the organic compounds do not have an unfavourable influence on the electrical properties of the polymers.

By comparison with metal-free stabilizers, such as for example diphenyl thiourea and 2-phenyl indole, the polymers stabilized according to the invention with 1,2,4-triazole, show a substantially better light and heat stability.

The triazole stabilizers are used in the conventional manner by adding them alone, or in admixture with one another and/or other stabilizers in a quantity of 0.1 to 5% by weight, advantageously 0.5 to 2% by weight referred to the halogen containing polymer, to the polymer or copolymer. The stabilizer can be added during the polymerization, when admixing the plasticizer or on the roller.

The following examples further illustrate the invention without limiting it thereto.

Example 1

100 parts by weight of a polyvinyl chloride produced by emulsion polymerization and having a K-value of 70, are mixed on a roller at a temperature of 160° C. with the substance indicated below under a–e.

(a) 1 part by weight of 3-ureido-5-phenyl-1,2,4-triazole
(b) 2 parts by weight of 3-ureido-5-phenyl-1,2,4-triazole
(c) 1 part by weight of 3-ureido-5-p-chlorophenyl-1,2,4-triazole
(d) 1 part by weight of 3-amino-5-p-chlorophenyl-1,2,4-triazole
(e) 1 part by weight of 3-ureido-5-(2,5-dichlorophenyl)-1,2,4-triazole.

After rolling for 10 minutes, samples are taken and these are exposed for 24 and 100 hours to the light of a xenon high-pressure lamp ("xenon test" apparatus, original Hanau).

Samples of the sheet obtained after a rolling period of 25 minutes are stored for 90 minutes in a circulating air heating chamber at a temperature of 170° C.

From the following table it can be seen that the stabilizers containing polymers show a later discoloration than the non-stabilized samples.

The foils containing the stabilizers (a) to (e) were rolled for 10 minutes at 160° C. They were colorless after a light exposure for 100 hours, while the samples without these stabilizers were discolored after a light exposure of 24 hours.

| Stabilizer | Color after rolling for 25 mins. at 160° C. | Begin of discoloration of the foil rolled for 25 mins. after being in heating chamber at 170° C. |
|---|---|---|
| a | colorless | 60 minutes. |
| b | do | 90 minutes. |
| c | do | 60 minutes. |
| d | do | Do. |
| e | do | Do. |
| without stabilizer | brown | |

Example 2

(a) 60 parts by weight of a polyvinyl chloride produced by emulsion polymerization and 40 parts by weight of alkyl sulfonic acid ester of phenol-cresol are rolled for 10 minutes at 160° C. with 0.6 part by weight of (a) 3-ureido-5-phenyl-1,2,4-triazole or (b) 3-ureido-5-p-chlorophenyl-1,2,4-triazole. After being stored for several weeks under normal conditions and also after exposure for 72 hours to an ultra-violet lamp, the mixtures show neither discoloration nor efflorescence.

(b) Similar results are obtained if instead of the above triazoles there are used the following ones:

3-amino-1,2,4-triazole
3-amino-5-methyl-1,2,4-triazole
3-amino-5-heptadecyl-1,2,4-triazole
3-amino-5-benzyl-1,2,4-triazole
3-amino-5-cyclohexyl-1,2,4-triazole
3-amino-5-p-methoxy-phenyl-1,2,4-triazole
3-amino-5-o-methoxy-phenyl-1,2,4-triazole
3-amino-5-o-hydroxy-phenyl-1,2,4-triazole
3-amino-5-p-methyl-phenyl-1,2,4-triazole
3-amino-5-p-tert.-butylphenyl-1,2,4-triazole
3-methylamino-1,2,4-triazole
3-p-tolylamino-1,2,4-triazole
3-p-ethoxy-phenylamino-1,2,4-triazole
3-o-chloro-phenylamino-1,2,4-triazole
3-p-hydroxy-phenylamino-1,2,4-triazole
3-cyclohexylamino-1,2,4-triazole
3-benzylamino-1,2,4-triazole

Example 3

60 parts by weight of a polyvinyl chloride produced by emulsion polymerization and 40 parts by weight of dioctyl phthalate are rolled for 10 minutes at 160° C. with 0.6 part by weight of either (a) 3-ureido-5-phenyl-1,2,4-triazole or (b) 3-ureido-5-p-chlorophenyl-1,2,4-triazole. After storage for several weeks under normal conditions and also after exposure for 72 hours with an ultra-violet lamp, the mixtures show neither discoloration nor efflorescence.

Example 4

(a) 60 parts by weight of polyvinyl chloride and 40 parts by weight of dioctyl phthalate are rolled for 60 minutes at 160° C. with either (a) 3-amino-5-p-chlorophenyl-1,2,4-triazole or (b) 3-ureido-5-p-chlorophenyl-1,2,5-triazole. These sheets are only slightly discolored at the end of this period.

(b) Similar results are obtained if instead of the above-mentioned triazoles there are used the triazoles mentioned in Example 2(b).

Example 5

100 parts by weight of a copolymerizate of vinylchloride and vinyl acetate with a vinyl acetate content of about 3% are rolled at 160° C. with 1 part by weight each of (a) 3-amino-5-phenyl-1,2,4-triazole or
(b) 3-amino-5-p-chlorophenyl-1,2,4-triazole.

While a copolymerizate without the addition of a stabilizer is discolorized after about 5 minutes, the mixture (a) shows a discoloration only after 25 minutes and mixture (b) only after 15 minutes.

Similar results are obtained if instead of the above-mentioned copolymerizate there is used a copolymerizate containing vinylidene chloride besides the vinyl chloride. Furthermore there are obtained comparable results if instead of the above triazoles the triazoles mentioned in Example 2(b) are used as stabilizers.

We claim:

1. As a new composition of matter, a halogen-containing polymer stabilized with 0.1–5% by weight, based on the polymer, of a 1,2,4-triazole of the general formula $$\begin{array}{c} N\!\!-\!\!\!-\!\!\!-\!\!C\!\!-\!\!NH\!\!-\!\!R_1 \\ \parallel \quad \quad \parallel \\ R\!\!-\!\!C \quad \quad N \\ \diagdown \!\!\diagup \\ N \\ | \\ H \end{array}$$

wherein R is selected from the group consisting of hydrogen and hydrocarbon radicals of 1–17 carbon atoms which can furthermore be substituted by —OH, methoxy, ethoxy, and halogen, and $R_1$ is selected from the group consisting of R and —$CONHR_2$, wherein $R_2$ is selected from the group consisting of hydrogen and a lower alkyl radical, said halogen-containing polymer being selected from the group consisting of homopolymers and copolymers of vinyl chloride and vinylidene chloride.

2. A process of stabilizing halogen-containing homopolymers and copolymers of vinyl chloride and vinylidene chloride against heat and light which comprises mixing the polymer on a roller at a temperature of about 160° C. with 0.1–5% by weight, based on the polymer, of a stabilizer of the general formula $$\begin{array}{c} N\!\!-\!\!\!-\!\!\!-\!\!C\!\!-\!\!NH\!\!-\!\!R_1 \\ \parallel \quad \quad \parallel \\ R\!\!-\!\!C \quad \quad N \\ \diagdown \!\!\diagup \\ N \\ | \\ H \end{array}$$

wherein R is selected from the group consisting of hydrogen and hydrocarbon radicals of 1–17 carbon atoms which can furthermore be substituted by halogen, OH, methoxy, and ethoxy groups, and $R_1$ is selected from the group consisting of R and —$CONHR_2$, wherein $R_2$ is selected from the group consisting of hydrogen and a lower alkyl radical.

3. As a new composition of matter polyvinyl chloride stabilized with 0.1–5% by weight, based on the polymer, of 3-ureido-5-phenyl-1,2,4-triazole.

4. As a new composition of matter polyvinyl chloride stabilized with 0.1–5% by weight, based on the polymer, of 3-amino-5-p-chlorophenyl-1,2,4-triazole.

5. As a new composition of matter polyvinyl chloride stabilized with 0.1–5% by weight, based on the polymer, of 3-ureido-5-(2,5-dichlorophenyl)-1,2,4-triazole.

6. As a new composition of matter, polyvinyl chloride stabilized with 0.1–5% by weight, based on the polymer, of 3-ureido-5-p-chlorophenyl-1,2,4-triazole.

7. A vinyl chloride-vinyl acetate copolymer stabilized with 0.1–5% by weight, based on the polymer, of 3-amino-5-phenyl-1,2,4-triazole.

8. A vinyl chloride-vinyl acetate copolymer stabilized with 0.1–5% by weight, based on the polymer, of 3-amino-5-p-phenyl-1,2,4-triazole.

9. A process of stabilizing polyvinyl chloride against heat and light which comprises mixing said polymer on a roller at a temperature of about 160° C. with about 1% by weight of a stabilizer selected from the group consisting of 3-ureido-5-phenyl-1,2,4-triazole, 3-ureido-5-p-chlorophenyl-1,2,4-triazole, 3-amino-5-p-chlorophenyl-1,2,4-triazole, and 3-ureido-5-(2,5-dichlorophenyl)-1,2,4-triazole.

10. A process of stabilizing a vinyl chloride-vinyl acetate copolymer against heat and light which comprises rolling said polymer at a temperature of about 160° C. with about 1% by weight of a stabilizer selected from the group consisting of 3-ureido-5-phenyl-1,2,4-triazole, 3-ureido-5-p-chlorophenyl-1,2,4-triazole, 3-amino-5-p-chlorophenyl-1,2,4-triazole, and 3-ureido-5-(2,5-dichlorophenyl)-1,2,4-triazole.

11. A process of stabilizing a vinyl acetate-vinylidene chloride copolymer against heat and light which comprises rolling said polymer at a temperature of about 160° C. with about 1% by weight of a stabilizer selected from the group consisting of 3-ureido-5-phenyl-1,2,4-triazole, 3-ureido-5-p-chlorophenyl-1,2,4-triazole, 3-amino-5-p-chlorophenyl-1,2,4-triazole, and 3-ureido-5-(2,5-dichlorophenyl)-1,2,4-triazole.

References Cited in the file of this patent

UNITED STATES PATENTS

| | | |
|---|---|---|
| 2,224,944 | Young | Dec. 17, 1940 |
| 2,476,832 | Donia | July 19, 1949 |
| 2,534,914 | Kendall et al. | Dec. 19, 1950 |